United States Patent [19]

Weber et al.

[11] Patent Number: 4,568,188

[45] Date of Patent: Feb. 4, 1986

[54] MICROSCOPE PHOTOMETER

[75] Inventors: Klaus Weber, Konigsbronn; Wolfgang Schob, Oberkochen, both of Fed. Rep. of Germany

[73] Assignee: Carl-Zeiss Stiftung, Heidenheim/Brenz, Oberkochen, Fed. Rep. of Germany

[21] Appl. No.: 475,941

[22] Filed: Mar. 16, 1983

[30] Foreign Application Priority Data

Apr. 8, 1982 [DE] Fed. Rep. of Germany ....... 3213145

[51] Int. Cl.[4] .......................... G01B 9/04; G01B 11/02; G02B 21/00
[52] U.S. Cl. ................................... 356/384; 356/152; 356/225; 356/400; 350/507
[58] Field of Search ............... 356/150, 384, 387, 372, 356/383, 445, 225, 233, 152; 350/520, 522, 507; 250/571

[56] References Cited

U.S. PATENT DOCUMENTS

| | | | |
|---|---|---|---|
| 1,761,260 | 6/1930 | Gallasch | 356/150 |
| 3,827,811 | 8/1974 | Kato et al. | 356/225 |
| 3,953,133 | 4/1976 | Jacoby | 356/152 |
| 3,985,451 | 10/1976 | Plöckl | 356/429 |
| 4,135,778 | 1/1979 | Lincoln | 350/520 |
| 4,441,817 | 4/1984 | Pryor | 250/227 |

FOREIGN PATENT DOCUMENTS 55-87902 7/1980 Japan .
2001774 2/1979 United Kingdom .

*Primary Examiner*—R. A. Rosenberger
*Assistant Examiner*—Michael F. Vollero
*Attorney, Agent, or Firm*—Hopgood, Calimafde, Kalil, Blaustein & Judlowe

[57] ABSTRACT

The invention contemplates a photometer tube having a rotatably mounted slit-diaphragm insert, with provision for scanning a specimen object through the slit, in the direction perpendicular to the instantaneous longitudinal orientation of the slit. In a first embodiment, the rotatable slit is coupled with an angle transmitter which supplies a control signal for scanning by a motor-driven X-Y specimen stage. In a second embodiment, the diaphragm holder itself is mounted on a carrier, for lineal displacement on the carrier in the direction perpendicular to the direction of the slit, and the carrier is rotatable to permit slit orientation with respect to a pattern of interest in an observed specimen.

8 Claims, 7 Drawing Figures

MICROSCOPE PHOTOMETER

BACKGROUND OF THE INVENTION

The present invention relates to a microscope photometer having a diaphragm with rectangular aperture disposed in an intermediate-image plane.

In known microphotometric arrangements, measurement diaphragms are, as a rule, disposed in a plane in front of the receiver used for detection, said plane being conjugate to the specimen plane. Such diaphragms are frequently made replaceable, to permit use of different measurement diaphragms, of form adapted to particular specimen detail to be detected. For example, slit-shaped or rectangular diaphragms are used if strip-shaped or elongate details of the specimen are to be examined.

Adjusted adaptation of specimen detail of interest to the measurement diaphragm is effected by displacing the specimen in the specimen plane, either by hand or by a so-called scanning stage which can be motor-driven in two directions (X, Y) and which also permits of sequential scanning in any direction of the specimen structure to be measured.

Further, West German Pat. No. 2,729,024, discloses that scanning movement of the specimen image over the photometer diaphragm may be effected by controlled displacement of a lens member in two directions (X, Y).

In the case of rectangular diaphragms, for example slit diaphragms, it is also necessary to adjust for correlation of angular orientation of diaphragm aperture with that of specimen detail. Such rotary displacement has heretofore been effected solely via manipulation in the specimen plane, a procedure which is problematic during a scanning process and which when working with large imaging scales, requires a rotatable stage whose axis must correspond very precisely to the optical axis of the imaging system.

BRIEF STATEMENT OF THE INVENTION

The object of the present invention is to simplify the achievement of angular alignment between a measurement diaphragm and specimen detail in a microscope photometer.

This object is achieved by providing a rotatable diaphragm mount, and coupled means for adjustably setting rotary displacement of the diaphragm.

Since relative rotary displacement between the specimen and the measurement diaphragm takes place in a plane in which there is an enlarged image of the specimen, no particularly great mounting demands need be imposed on the rotatable diaphragm. Since rotary displacement is decoupled from the plane of the specimen, a simple mechanical stage can be used to mount the specimen; and if automatic scanning of the specimen is desired, the stage is motor-driven in two component directions.

In the latter connection, it is of particular advantage for the rotatable diaphragm to be coupled with an angle transmitter, providing an output signal to control electronics for the scanning stage. By simply rotating the diaphragm while viewing, one may achieve the result of scanning along a curved path in such manner that, for example, the longitudinal direction of the diaphragm is always oriented perpendicular to the structure of specimen detail to be scanned. This is particularly advantageous in the photometry of irregularly shaped biological specimens (for example, chromosomes).

If the size of structures to be photometered is below the step length of about 0.5 $\mu$m (the lower limit of ordinary scanning specimen stages), it is advisable to have scanning movement take place in the image of the specimen. It is then advisable to mount the rotatable diaphragm for movement perpendicular to the limiting surfaces of its aperture and to provide, for example, an electric-motor drive which imparts linear scanning motion to the diaphragm.

As an alternative, it is possible to use, instead of a movable diaphragm, a detector diode array, mounted for rotational displacement. In this case, both diaphragm and detector functions are provided by individual elements of the array, and individual element dimensions determine the size of the diaphragm.

To adapt the size of the diaphragm to the specimen structure to be examined, it may be advisable to provide a diaphragm of variable dimensions, for example, a slit of variable width. A light guide may serve to conduct light coming from the slit and to adapt the geometry of the slit to the cross section of the light-sensitive surface of the particular detector.

DETAILED DESCRIPTION

The invention will be described for illustrative embodiments, in conjuncion with the accompanying drawings, in which.

Figure 1:
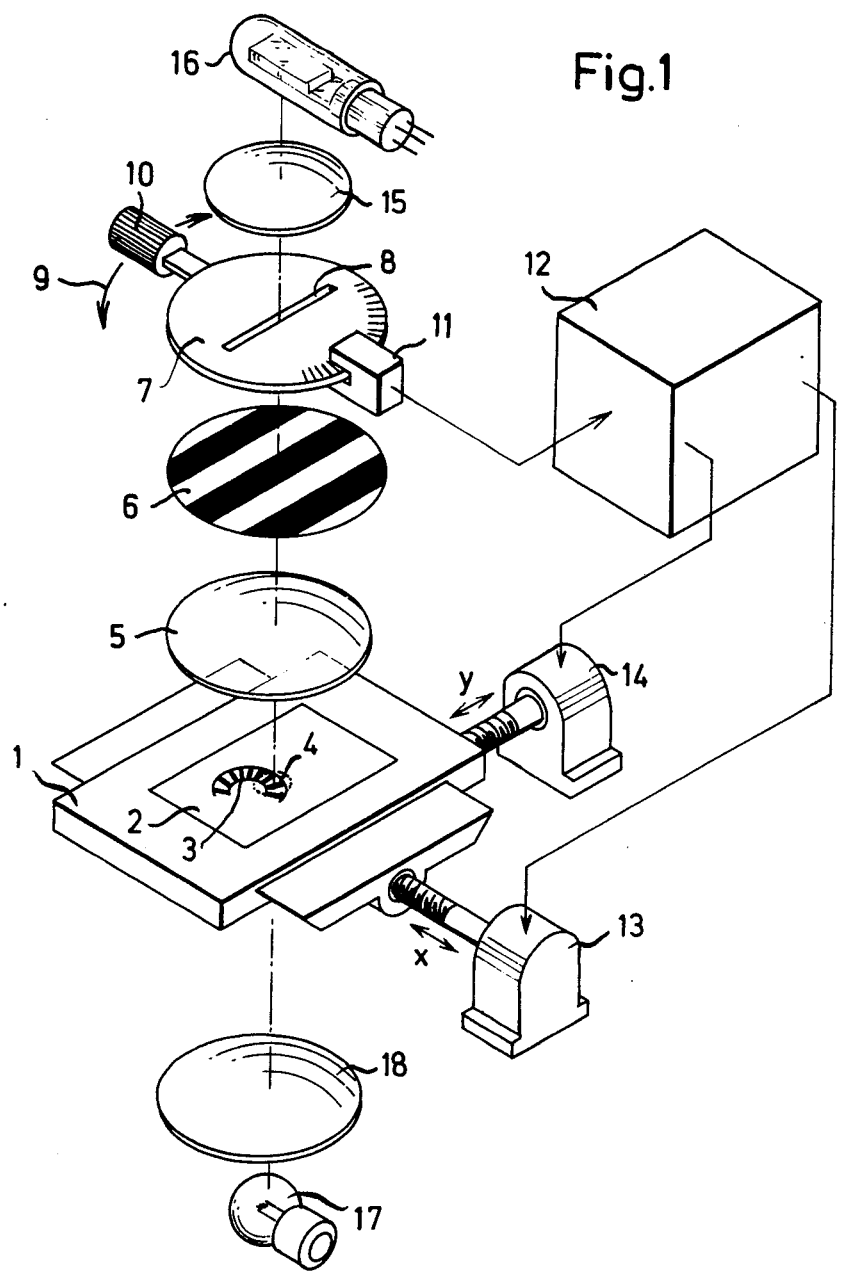
FIG. 1 is an isometric and somewhat exploded diagram schematically showing a first embodiment of the invention.

In FIG. 1, specimen stage 1 carries a slide 2 and is displaceable by motors 13 and 14 in two coordinate directions. On the slide 2, specimen 3 of striped or strip-shaped structural detail is illuminated in the region of a limited viewing field 4, illumination being provided by a light source 17 and an optical system 18.

An optical system (objective) 5 produces an intermediate image 6 of the viewing field 4 at the plane of a diaphragm 7. A lens 15 projects the exit pupil of the objective 5 through a slit-shaped diaphragm aperture 8 onto the light-sensitive surface of a photodetector 16. The foregoing coresponds to the basic construction of a traditional microscope photometer.

In accordance with the invention, diaphragm 7 is rotatably mounted (as indicated by the arrow 9), and a handle 10 enables the user to so adjust rotary displacement that slit 8 extends parallel to the direction of band structures (e.g., stripes) in the intermediate image 6. An angle transmitter 11 coupled with diaphragm 7 reports the rotary position of the slit 8 to control electronics 12; and, using the output signal from angle transmitter 11, the control electronics 12 so calculates and supplies drive signals for direction and speed of stepping motors 13 and 14 that stage 1 travels perpendicular to the instantaneous direction of the slit.

Figure 1A:
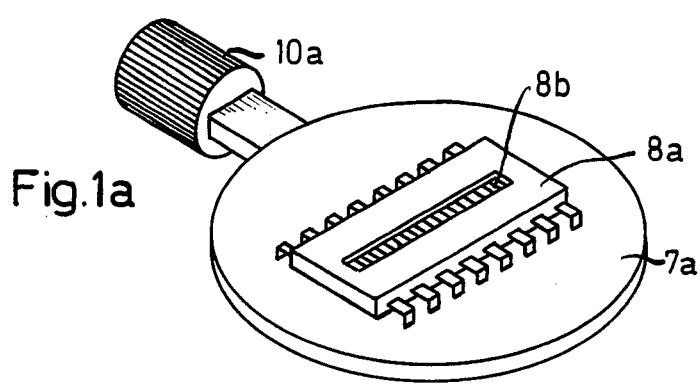
FIG. 1a is an enlarged view in perspective to show an alternative component of FIG. 1.

FIG. 1a illustrates modification of FIG. 1 by substitution of a self-scanning detector array 8a, with an aligned array of plural light-sensitive elements 8b, in place of the slit 8 of diaphragm 7 (FIG. 1). The array 8a is mounted to a carrier 7a which, like diaphragm 7, is rotatable via a handle (10a). Use of the FIG. 1a substitution elminates need for lens 15 and photomultiplier 16; and by orienting the array 8b of detector 8a parallel to the stripe structure in FIG. 1, it is thereby possible additionally to scan in a second direction, within individual stripes, whereas orientation of array 8b perpendicular to the stripes permits fast scanning over a plurality of stripes, without moving stage 1.

Figure 2A:
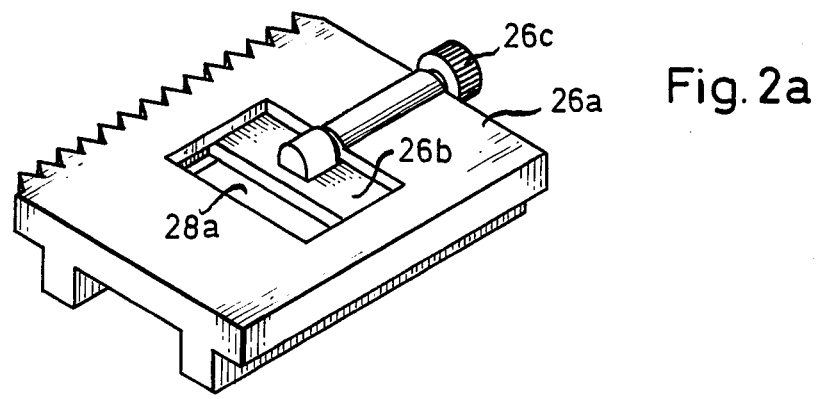
FIG. 2a is an enlarged view in perspective to show an alternative component of FIG. 2.
Figure 2:
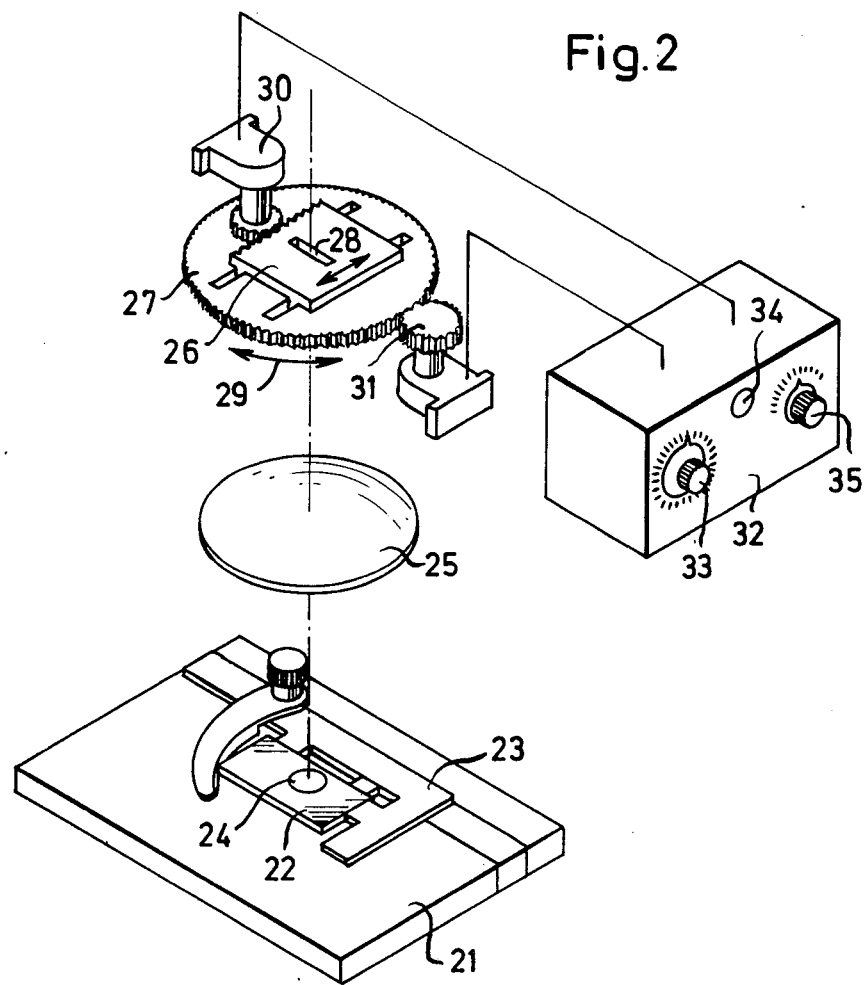
FIG. 2 is a similar diagram of a second embodiment of the invention.

FIG. 2 shows a second embodiment in which the viewing field 24 of a specimen clamped by a specimen holder 23 is imaged by an imaging optical system 25 into the plane of the slit 28, which is supported both for rotary and for lineal displacement. Drives 31 and 30, controlled from central control means 32, respectively determine rotary position of a diaphragm carrier 27 and lineal displacement of a diaphragm 26 movably supported on the carrier 27.

Control means 32 has a knob 33 for setting the rotary position of slit 28, as well as a start-stop push button 34 and a knob 35 for setting the speed of diaphragm (26) scanning motion. For the photometer construction of FIG. 2, only a simple mechanical stage 21 is required, to enable manual shift of the specimen 22 to examine the specimen for fields 24 of structural detail of interest. In a more comfortable embodiment diaphragm 26 may have a slit of variable width as shown in FIG. 2a. This is effected by a plane 26b sliding on rails in a rectangular opening 28 of diaphragm body 26a. The position of plate 26b and thus the width of the slit can be controlled by an adjustment screw 26c.

Figure 3A:
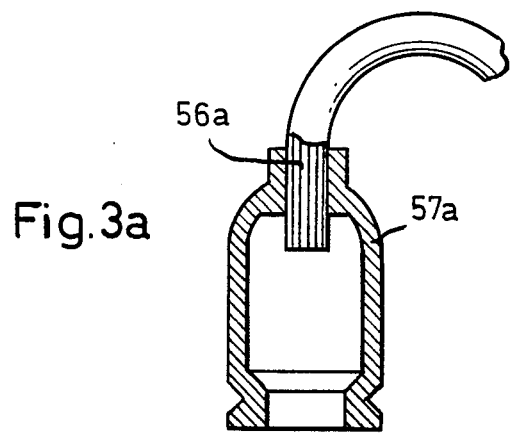
FIG. 3a is a side view, partly broken and in section, to show an alternative component of FIG. 3.
Figure 3:
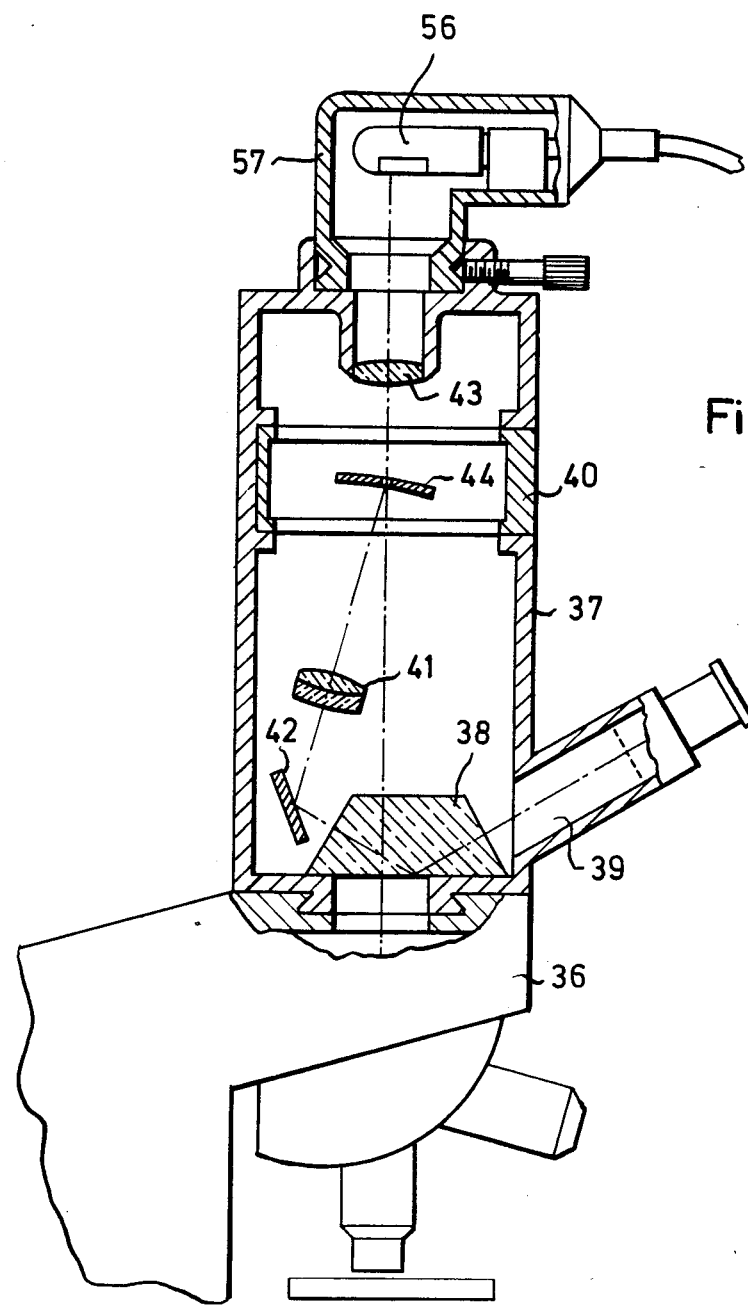
FIG. 3 is a side view in elevation, partly brokenaway and in simplified vertical section, to show apparatus embodying components of FIG. 2.
Figure 4:
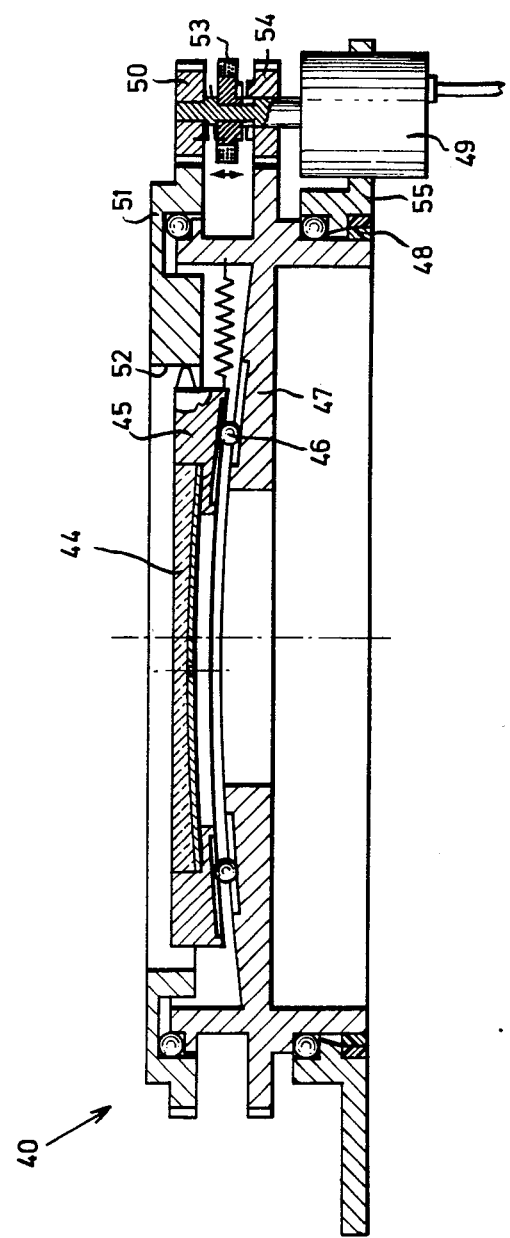
FIG. 4 is a more detailed sectional view of the part 40 of FIG. 3, shown on an enlarged scale.

FIGS. 3 and 4 show greater detail of a specific structural development of the embodiment of FIG. 2, in which the objective holder 36 of a microscope mounts a compact photometer tube 37. Within tube 37, a prism 38 appears as a flat parallel plate, in respect of the perpendicularly impinging axis of rays from the objective. In the upper part of tube 37, a diaphragm slide-in unit 40 (shown in greater detail in FIG. 4) has been removably inserted. Within unit 40, an intermediate image is produced at a diaphragm 44 which is slightly inclined with respect to the optical axis of the incident light ray, and which reflects the intermediate image back via an optical unit 41, a deflection mirror 42 and the base surface of prism 38, into a binocular tube 39, where the user may view an image of the surrounding field of the aperture of diaphragm 44.

A lens 43 focuses the exit pupil of the microscope objective through the aperture of diaphragm 44 onto the light-sensitive surface of a photomultiplier 56, within a casing 57 which is removably mounted to the photometer tube 37. In an alternative arrangement, the case 57 and its photometer multiplier 56 can be removed to accept substitution of a second casing 57a, wherein a light-guiding fiber bundle 56a is mounted with its polished end portion positioned at the image of the exit pupil of the microscope objective (see FIG. 3a), the other end of the fiber bundle 56a being coupled to a suitable detector (not shown) outside the microscope housing.

As shown in FIG. 4, diaphragm 44 is defined within the slightly concave mirror surface of a glass plate whose holder 45 is displaceable via rollers 46 on a rotatable ring insert 47. Insert 47 is coupled via a friction brake 48 with that part 55 of the diaphragm slide-in unit 40 which is removably mounted to housing 37.

To produce a linear scanning movement of diaphragm 44, a motor 49, via a pinion 50, drives a ring gear 51 which is supported for rotation with respect to insert 47, and the inner edge of ring gear 51 has a control cam 52 against which the diaphragm holder 45 is urged by spring action.

Rotary adjustment of the diaphragm 44 is provided via another pinion 54 meshing with teeth at the edge of insert 47 and selectively engageable to the drive shaft of motor 49, via shiftable magnetic-clutch means 53.

It will be understood that the insert 40 which has been described above may be replaced by other inserts, as for example, an insert having a revolving disk diaphragm.

What is claimed is:

1. In a microscope photometer wherein an objective forms an intermediate image of a specimen in an intermediateimage plane, a diaphragm comprising a carrier mounted for rotary displacement and a slide mounted for rectilineal movement on said carrier, said slide having a rectangular aperture lying substantially in said intermediate-image plane, means for rotating said carrier to adjustably set the instantaneous orientation of said aperture, scanning means for effectively displacing said aperture in a direction perpendicular to one of the limiting edges of said aperture, and means including a single drive motor and clutch means for optionally coupling said motor to rotate said carrier or to impart guided movement to said slide.

2. A photometer according to claim 1, wherein a lens behind said diaphragm focuses the exit pupil of the objective directly onto a photo-sensitive detector.

3. A photometer according to claim 1, wherein a lens behind said diaphragm focuses the exit pupil of the objective directly onto the entrance surface of a light guide.

4. A photometer according to claim 1, wherein the diaphragm aperture is of variable dimensions.

5. A photometer according to claim 1, wherein the diaphragm and its carrier are contained in a replaceable slide-in unit of a photometer housing or housing module.

6. A photometer according to claim 1, wherein specimen-side surfaces of the diaphragm are reflecting.

7. In a microscope photometer wherein an objective forms an intermediate image of a specimen in an intermediateimage plane, a diaphragm mounted for rotary displacement and having a rectangular aperture lying substantially in said intermediate plane, a specimen stage and drive means for imparting displacement motion thereto in each of two coordinate directions, and means including a diaphragm-orientation tracking device and connected to said drive means for controlling stage positioning as a function of the instantaneously tracked rotary orientation of the diaphragm aperture.

8. The photometer of claim 7, in which said diaphragm is manually rotatable and in which said last-defined means supplies drive signals for direction and speed of the respective coordinates of stage displacement such that said stage travels perpendicular to the instantaneous orientation of the major dimension of said aperture.

* * * * *